(12) United States Patent
Jones et al.

(10) Patent No.: US 11,981,511 B2
(45) Date of Patent: May 14, 2024

(54) ARTICLE TRANSPORT VEHICLE

(71) Applicant: Transitions Optical, Ltd., Tuam (IE)

(72) Inventors: Douglas B. Jones, Kilcahill (IE); Jared L. Snow, Fort Lorenzo (IE); Willard Beamer, Palmetto, FL (US); Joseph C. Stitt, Craughwell (IE); Lawrence M. Minor, McKinney, TX (US)

(73) Assignee: Transitions Optical, Ltd., Tuam (IE)

( * ) Notice: Subject to any disclaimer, the term of this patent is extended or adjusted under 35 U.S.C. 154(b) by 902 days.

(21) Appl. No.: 17/041,737

(22) PCT Filed: Mar. 28, 2018

(86) PCT No.: PCT/EP2018/057906
§ 371 (c)(1),
(2) Date: Sep. 25, 2020

(87) PCT Pub. No.: WO2019/185132
PCT Pub. Date: Oct. 3, 2019

(65) Prior Publication Data
US 2021/0122576 A1    Apr. 29, 2021

(51) Int. Cl.
*B65G 17/32* (2006.01)
*B29D 11/00* (2006.01)
(Continued)

(52) U.S. Cl.
CPC ...... *B65G 17/323* (2013.01); *B29D 11/00423* (2013.01); *B65G 35/06* (2013.01); *B65G 54/02* (2013.01)

(58) Field of Classification Search
CPC ...... B65G 17/323; B65G 35/06; B65G 47/90; B65G 47/901; B65G 47/902;
(Continued)

(56) References Cited

U.S. PATENT DOCUMENTS 3,747,737 A    7/1973   Brooke
3,860,104 A *  1/1975   Strauss ................. B65G 17/20
                                              198/470.1
(Continued)

FOREIGN PATENT DOCUMENTS

CN    102779775 A    11/2012
CN    103659809 A    3/2014
(Continued)

*Primary Examiner* — Gene O Crawford
*Assistant Examiner* — Keith R Campbell
(74) *Attorney, Agent, or Firm* — The Webb Law Firm

(57) ABSTRACT

An article transport vehicle (200) has: a carrier base (202) configured for movement along a guideway and a pair of gripping arms (216), each gripping arm (216) having a first end (216a) connected to the carrier base (202) and a second end (216b) protruding from the carrier base (202). The pair of gripping arms (216) is movable between a closed position configured for holding an article (302) and an open position configured for releasing the article (302). The article transport vehicle (200) further has a closure mechanism (238) for moving the pair of gripping arms (216) between the closed position and the open position. The closure mechanism (238) is configured for biasing the pair of gripping arms (216) to the closed position and moving the pair of gripping arms (216) to the open position when the carrier base (202) is positioned at a predetermined portion of the guideway.

19 Claims, 6 Drawing Sheets

(51) Int. Cl.
*B65G 35/06* (2006.01)
*B65G 54/02* (2006.01)

(58) Field of Classification Search
CPC .... B65G 47/912; B65G 47/914; B65G 54/02; B29D 11/0023; B29D 11/00423
See application file for complete search history.

(56) References Cited

U.S. PATENT DOCUMENTS

| | | | | |
|---|---|---|---|---|
| 4,573,862 | A * | 3/1986 | Anderson | B65G 47/901 414/753.1 |
| 4,852,722 | A | 8/1989 | Houseman | |
| 5,201,501 | A | 4/1993 | Fassler | |
| 5,893,700 | A | 4/1999 | Kronseder | |
| 6,071,440 | A | 6/2000 | Wang et al. | |
| 6,199,680 | B1 * | 3/2001 | Sakai | B65B 35/58 53/542 |
| 6,234,300 | B1 * | 5/2001 | De Vos | B65G 47/90 198/470.1 |
| 6,438,449 | B2 | 8/2002 | Kawamatsu et al. | |
| 7,185,753 | B2 * | 3/2007 | Hartness | B65G 47/5104 198/474.1 |
| 7,661,739 | B2 * | 2/2010 | Burgmeier | B67C 3/242 294/116 |
| 8,206,144 | B2 * | 6/2012 | Ng | B29C 49/4205 425/534 |
| 8,834,091 | B2 | 9/2014 | Jin et al. | |
| 8,905,223 | B2 * | 12/2014 | Ichihara | B65G 35/06 198/465.1 |
| 9,701,487 | B2 * | 7/2017 | Unterseher | B65G 54/02 |
| 11,377,311 | B2 * | 7/2022 | Elsperger | H02K 41/031 |
| 11,708,226 | B2 * | 7/2023 | Neubauer | B67C 3/24 198/617 |
| 2003/0133780 | A1 | 7/2003 | Yokota et al. | |
| 2006/0070850 | A1 | 4/2006 | Hartness et al. | |
| 2010/0151069 | A1 | 6/2010 | Ng et al. | |
| 2012/0241407 | A1 | 9/2012 | Fahldieck | |
| 2013/0140839 | A1 | 6/2013 | Quinn et al. | |
| 2014/0030048 | A1 | 1/2014 | Kosuge et al. | |
| 2014/0340509 | A1 | 11/2014 | Fairbairn | |
| 2017/0323822 | A1 * | 11/2017 | Velazquez | H01L 21/67023 |

FOREIGN PATENT DOCUMENTS

| | | |
|---|---|---|
| EP | 0989060 A2 | 3/2000 |
| GB | 2203404 A | 10/1988 |
| JP | 2001156153 A | 6/2001 |
| KR | 1020080114155 A | 12/2008 |
| KR | 20110105572 A | 9/2011 |
| WO | 9628271 A1 | 9/1996 |
| WO | 2017193001 A1 | 11/2017 |

* cited by examiner

ARTICLE TRANSPORT VEHICLE

CROSS-REFERENCE TO RELATED APPLICATIONS

This application is the United States national phase of International Application No. PCT/EP2018/057906 filed Mar. 28, 2018, the disclosure of which is hereby incorporated by reference in its entirety.

BACKGROUND OF THE INVENTION

Field of the Invention

The present invention relates to an article transport vehicle. In particular, the present invention relates to an optical article transport vehicle movable along a guideway, the optical article transport vehicle having a pair of gripping arms for gripping an optical article and movable between an open position and a closed position, wherein the pair of gripping arms are movable to the open position when the optical article transport base is positioned at a predetermined portion of the guideway.

Description of the Related Art

With optical articles, such as lenses, one or more surfaces may be subjected to a treatment to enhance the overall performance and function of the optical articles. Examples of such treatments include the formation of one or more coatings on a surface of an optical substrate of the optical article.

In order to manufacture a coated optical article from an uncoated optical substrate, a variety of manufacturing techniques have been developed. For smaller batches, it may be economical to manufacture coated optical articles by passing a single optical article through a plurality of discrete processing stations, such as a washing station, a coating station, and a curing station, before a subsequent optical article is processed. In large scale operations, optical articles may be processed on an automated production line configured for processing hundreds of optical articles per hour. For example, optical articles may be continuously loaded onto a moving conveyor belt which passes through a plurality of processing stations. With certain processing stations, such as a spin coating station, optical articles must be removed from the conveyor belt and placed in the processing station. For such operations, special equipment must be provided to move the optical articles from the conveyor belt to the processing stations. During handling of the optical article, special care must be taken to prevent contact between the processing equipment and a coating surface of the optical article.

It would be desirable to develop a new optical article transport system for moving optical articles along the production line. In particular, it would be desirable to develop a new optical article transport vehicle for use in a production line having a plurality of processing stations.

SUMMARY OF THE INVENTION

In accordance with the present invention, there may be provided an article transport vehicle with a carrier base configured for movement along a guideway. The article transport vehicle may further have a pair of gripping arms, each gripping arm having a first end connected to the carrier base and a second end protruding from the carrier base. The pair of gripping arms may be movable between a closed position configured for holding an article and an open position configured for releasing the article. The article transport vehicle may further have a closure mechanism for moving the pair of gripping arms between the closed position and the open position. The closure mechanism may be configured for biasing the pair of gripping arms to the closed position and moving the pair of gripping arms to the open position when the carrier base is positioned at a predetermined portion of the guideway.

In accordance with the present invention, the closure mechanism may have a pneumatic reservoir having a first chamber and a second chamber in fluid communication with the first chamber. The closure mechanism may have an actuator, a first chamber on a first side of the actuator, and a second chamber on a second side of the actuator. The first chamber may have a first volume and the second chamber may have a second volume, wherein the second volume may be smaller than the first volume. In the closed position, a pressure in the first chamber may be higher than a pressure in the second chamber such that the actuator is positioned in a first position, and wherein, in the open positon, the pressure in the first chamber may be lower than the pressure in the second chamber such that the actuator is positioned in a second position. The closure mechanism may have a linkage arrangement movable between a first position, wherein the pair of gripping arms is in the closed position, and a second positon, wherein the pair of gripping arms is in the open position. The linkage arrangement may be biased to the first position by at least one biasing device, such as a spring. The second end of each gripping arm may have a pair of projections protruding inwardly from an inward lateral surface and upwardly from an upper surface of each gripping arm. At least one of the pair of gripping arms may be made from a first material and at least one of the projections is made from a second material different from the first material.

In accordance with the present invention, a secondary closure mechanism may be provided to bias the pair of gripping arms to the closed position. For example, the secondary closure mechanism may be a spring or a resiliently elastic band. At least one arm position indicator may be provided on at least one of the pair of gripping arms. The at least one arm position indicator may be configured for indicating a position of the at least one of the pair of gripping arms. For example, the at least one arm position indicator may be a permanent magnet. At least one centering element may be for engaging an alignment rail along at least a portion of the guideway for centering the carrier base relative to the guideway. The pair of gripping arms may protrude relative to the carrier base in a direction substantially perpendicular to a direction of travel of the carrier base. The carrier base may have a magnetic flux source.

The features that characterize the present invention are pointed out with particularity in the claims, which are annexed to and form a part of this disclosure. These and other features of the invention, its operating advantages, and the specific objects obtained by its use will be more fully understood from the following detailed description in which non-limiting examples of the invention are illustrated and described.

BRIEF DESCRIPTION OF THE DRAWINGS

In FIGS. 1-11, like characters refer to the same components and elements, as the case may be, unless otherwise stated.

DETAILED DESCRIPTION OF THE INVENTION

Figure 1:
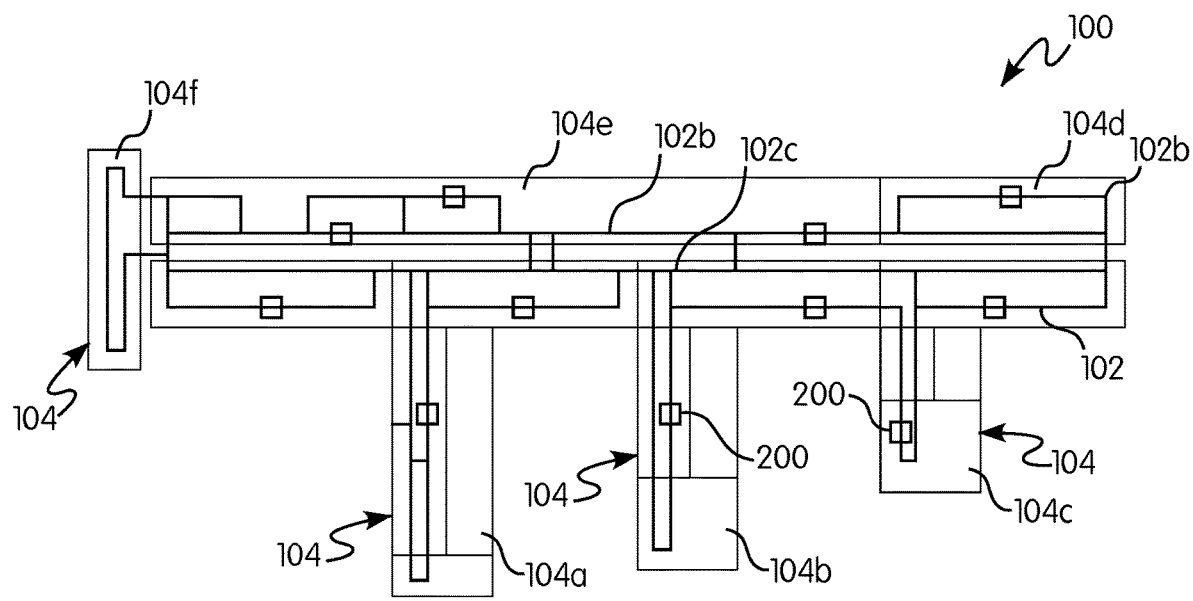
FIG. 1 is a schematic representation of an optical article production line in accordance with some examples of the present invention.

As used herein, the singular form of "a", "an", and "the" include plural referents unless the context clearly dictates otherwise.

Spatial or directional terms, such as "left", "right", "inner", "outer", "above", "below", and the like, relate to the invention as shown in the drawing figures and are not to be considered as limiting as the invention can assume various alternative orientations.

All numbers and ranges used in the specification and claims are to be understood as being modified in all instances by the term "about". By "about" is meant plus or minus twenty-five percent of the stated value, such as plus or minus ten percent of the stated value. However, this should not be considered as limiting to any analysis of the values under the doctrine of equivalents.

Unless otherwise indicated, all ranges or ratios disclosed herein are to be understood to encompass the beginning and ending values and any and all subranges or subratios subsumed therein. For example, a stated range or ratio of "1 to 10" should be considered to include any and all subranges or subratios between (and inclusive of) the minimum value of 1 and the maximum value of 10; that is, all subranges or subratios beginning with a minimum value of 1 or more and ending with a maximum value of 10 or less. The ranges and/or ratios disclosed herein represent the average values over the specified range and/or ratio.

The terms "first", "second", and the like are not intended to refer to any particular order or chronology, but refer to different conditions, properties, or elements.

All documents referred to herein are "incorporated by reference" in their entirety.

The term "at least" is synonymous with "greater than or equal to".

The term "not greater than" is synonymous with "less than or equal to".

As used herein, "at least one of" is synonymous with "one or more of". For example, the phrase "at least one of A, B, and C" means any one of A, B, or C, or any combination of any two or more of A, B, or C. For example, "at least one of A, B, and C" includes A alone; or B alone; or C alone; or A and B; or A and C; or B and C; or all of A, B, and C.

The term "adjacent" means proximate to but not in direct contact with.

The term "includes" is synonymous with "comprises".

As used herein, the terms "parallel" or "substantially parallel" mean a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values.

As used herein, the terms "perpendicular" or "substantially perpendicular" mean a relative angle as between two objects at their real or theoretical intersection is from 85° to 90°, or from 87° to 90°, or from 88° to 90°, or from 89° to 90°, or from 89.5° to 90°, or from 89.75° to 90°, or from 89.9° to 90°, inclusive of the recited values.

The term "optical" means pertaining to or associated with light and/or vision. For example, an optical element, article, or device can be chosen from ophthalmic elements, articles, and devices, display elements, articles, and devices, visors, windows, and mirrors.

The term "ophthalmic" means pertaining to or associated with the eye and vision. Non-limiting examples of ophthalmic articles or elements include corrective and non-corrective lenses, including single vision or multi-vision lenses, which may be either segmented or non-segmented multi-vision lenses (such as, but not limited to, bifocal lenses, trifocal lenses, and progressive lenses), as well as other elements used to correct, protect, or enhance (cosmetically or otherwise) vision, including without limitation, contact lenses, intra-ocular lenses, magnifying lenses, and protective lenses or visors.

As used herein, the terms "lens" and "lenses" mean and encompass at least individual lenses, lens pairs, partially formed (or semi-finished) lenses, fully formed (or finished) lenses, and lens blanks.

As used herein, the term "transparent", such as used in connection with a substrate, film, material, and/or coating, means that the indicated substrate, film, material, and/or coating has the property of transmitting light without appreciable scattering so that objects lying beyond are visibly observable.

As used herein, the term "coating" means a supported film derived from a flowable coating material, which can optionally have a uniform thickness, and specifically excludes polymeric sheets. The terms "layer" and "film" each encompass both coatings (such as a coating layer or a coating film) and sheets, and a layer can include a combination of separate layers, including sub-layers and/or over-layers. The verb "coating" means, within appropriate context, the process of applying a coating material (or materials) to the substrate to form a coating (or coating layer).

As used herein, the terms "cure", "cured", and related terms, mean that at least a portion of the polymerizable and/or crosslinkable components that form a curable composition are at least partially polymerized and/or crosslinked. In accordance with some examples, the degree of crosslinking can range from 5% to 100% of complete crosslinking. In accordance with some further examples, the degree of crosslinking can range from 30% to 95%, such as 35% to 95%, or 50% to 95%, or 50% to 85% of complete crosslinking. The degree of crosslinking can range between any combination of these recited lower and upper values, inclusive of the recited values.

As used herein, the term "IR" means infrared, such as infrared radiation. The term "infrared radiation" means electromagnetic radiation having a wavelength in the range of greater than 780 nm to 1,000,000 nm.

As used herein, the term "UV" means ultraviolet, such as ultraviolet radiation. The terms "ultraviolet radiation" and "ultraviolet light" mean electromagnetic radiation having a wavelength in the range of 100 nm to less than 380 nm.

The discussion of the invention may describe certain features as being "particularly" or "preferably" within certain limitations (e.g., "preferably", "more preferably", or "even more preferably", within certain limitations). It is to be understood that the invention is not limited to these particular or preferred limitations but encompasses the entire scope of the disclosure.

The invention comprises, consists of, or consists essentially of the following examples of the invention, in any combination. Various examples of the invention may be discussed separately. However, it is to be understood that this is simply for ease of illustration and discussion. In the practice of the invention, one or more aspects of the invention described in one example can be combined with one or more aspects of the invention described in one or more of the other examples.

With initial reference to FIG. 1, a production line 100 has a guideway 102 configured for supporting at least one optical article transport vehicle 200 (hereinafter referred to as "transport vehicle 200"). The production line 100 of the present invention can, with some examples, be used for the production of optical articles, such as lenses. Examples of optical articles that can be processed on the production line 100 of the present invention include, but are not limited to, optical lenses, ophthalmic lenses, and/or prescription lenses, which in each case can be finished lenses, unfinished lenses, or lens blanks. In some examples, the production line 100 of the present invention can be at least partially automated and optionally incorporated into art-recognized product tracking and control systems.

The guideway 102 may have a closed loop configuration or an open configuration. In a closed loop configuration, such as shown in FIG. 1, each transport vehicle 200 is movable in an infinite loop, while an open configuration (not shown) requires loading each transport vehicle 200 at a first end of the production line 100 and unloading each transport vehicle 200 at a second end of the production line 100. In some examples, the guideway 102 may be a moving belt, a track, or other moving mechanism. A position of the transport vehicle 200 may be fixed on the moving guideway 102. Alternatively, the transport vehicle 200 may be movable along the moving guideway 102. In other examples, the guideway 102 may be a stationary track with the transport vehicle 200 movable along the guideway 102. Each transport vehicle 200 may be configured for uni-directional or bi-directional movement along the guideway 102.

With continued reference to FIG. 1, the exemplary guideway 102 has one or more track sections 102a, one or more turn sections 102b, and one or more merging/diverging sections 102c. The guideway 102 may have a modular layout, wherein the arrangement of the one or more track sections 102a, one or more turn sections 102b, and one or more merging/diverging sections 102c can be changed to change a layout of the guideway 102. In some examples, the track sections 102a may be linear or curved, and may extend in a single plane or may extend from a first vertical plane to a second vertical plane. In some examples, the one or more turn sections 102b may be turns having constant or increasing/decreasing radius.

With continued reference to FIG. 1, the production line 100 has a plurality of processing stations 104 positioned along the guideway 102. Each processing station 104 is configured for performing a predetermined processing step on an optical article carried by the transport vehicle 200.

With continued reference to FIG. 1, at least one of the processing stations 104 may be a pre-treatment station 104a, such as a plasma chamber. With some examples, the pre-treatment station 104a may be a pass-through processing station wherein at least a portion of the transport vehicle 200, along with the optical article carried thereon, moves through the pre-treatment station 104a. The plasma surface treatment conducted within the pre-treatment station 104a can be selected from one or more art-recognized plasma surface treatment methods including, but not limited to, corona treatment, atmospheric plasma treatment, atmospheric-pressure treatment, flame plasma treatment, and/or chemical plasma treatment. With some examples, the surface treatment conducted in the chamber is an oxygen plasma treatment.

The surface treatment process in the pre-treatment station 104a involves, with some examples, treating the surface of an optical substrate to promote wetting and enhance adhesion of a coating that is subsequently applied to and formed thereon. Plasma treatments, including corona treatments, provide a clean and efficient method of altering the surface properties of an optical substrate, such as roughening and/or chemically altering one or more surfaces thereof, without altering the bulk properties of the optical substrate.

With continued reference to FIG. 1, at least one of the processing stations 104 may be a washing/drying station 104b. With some examples, the washing/drying station 104b may be a pass-through processing station wherein at least a portion of the transport vehicle 200, along with the optical article carried thereon, moves through the washing/drying station 104b. The washing/drying station 104b may have high pressure spray nozzles which spray a cleaning agent, such as deionized water, to clean the surface of the optical article. In some examples, the washing parameters of the washing/drying station 104b, such as liquid pressure and washing time, can be programmable and can vary based on parameters, such as the type and/or size of the optical substrate, plasma treatment in the pre-treatment station 104a, and/or subsequent coating processes. Following washing, the optical article can, with some examples, be dried in the washing/drying station 104b by one or more drying methods including, but not limited to, high speed air nozzle(s), which can be filtered air nozzles. The drying parameters can be programmed in a manner similar to those associated with the washing parameters, with some examples.

With continued reference to FIG. 1, the production line 100 may have at least one coating station 104c configured to apply a coating material on at least one surface of the optical article. In some examples, the coating station 104c may have a spin coating apparatus, or any other coating apparatus configured for applying a coating on at least one surface of the optical article. For example, the coating station 104c may have an inkjet printing apparatus having one or more print heads configured to controllably discharge atomized droplets of coating material onto one or more coating surfaces of the optical article. The coating station 104c may have a controller (not shown) for controlling the operation of the coating apparatus. For example, the controller may be configured for controlling the printing operations of the one or more print heads.

With continued reference to FIG. 1, at least one of the processing stations 104 may be a curing station 104d for selectively and independently curing (such as at least partially curing) each coating applied to the optical article by the coating station 104c. The curing station 104d may be at least one of: (i) a thermal curing station; (ii) a UV curing station; (iii) an IR curing station; and (iv) combinations of at least two of (i), (ii), and (iii). The curing time within the curing station 104d can also vary depending on, for example, the particular coating. Each curing station 104d, with some examples, can include therein an atmosphere selected from an inert atmosphere (such as, but not limited to, argon and/or nitrogen) and/or a reactive atmosphere (such as, but not limited to, oxygen, CO, and/or $CO_2$).

With continued reference to FIG. 1, at least one of the processing stations 104 may be an inspection station 104e configured for determining at least one characteristic of the optical article, such as the size or color of the optical article, or the presence or absence of at least one identifying indicia on at least one surface of the optical article. In some examples, the identification station 104e has at least one sensor for identifying at least one characteristic of the optical article. For example, the at least one sensor may be an optical sensor, such as a camera. The optical sensor may be configured to capture an image of the optical article and determine at least one characteristic of the optical article based on the properties of the image.

With continued reference to FIG. 1, at least one of the processing stations 104 may be a loading/unloading station 104f. In some examples, empty transport vehicles 200 may be loaded with optical articles, while finished optical articles may be unloaded from the production line 100. In some examples, separate loading and unloading stations may be provided.

Each transport vehicle 200 may be configured to be independently moved along the guideway 102 between various processing stations 104. In some examples, the production line 100 may be configured such that a first portion of the transport vehicles 200 move through a first subset of the processing stations 104, while a second portion of the transport vehicles 200 move through a second subset of the processing stations 104. In some examples, the first and second subsets of processing stations 104 may be mutually exclusive. In other examples, the first and second subsets of processing stations 104 may at least partially overlap.

Figure 2:
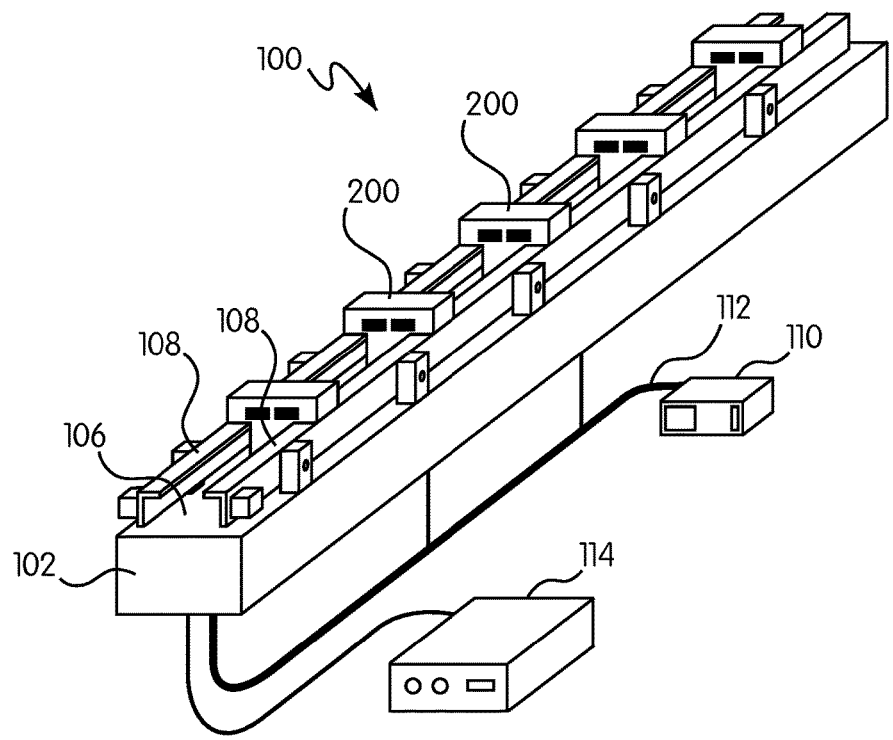
FIG. 2 is a representative perspective view of a portion of a guideway for use with the optical article production line according to some examples of the present invention.

With reference to FIG. 2, a portion of the guideway 102 for use with the production line 100 is illustrated in detail. In some examples, the guideway 102 has a guide channel 106 defined by a pair of rails 108. In other examples, the guideway 102 may be a single rail 108. The guide channel 106 is shaped to receive at least a portion of the transport vehicle 200. While FIG. 2 illustrates a linear guideway 102 extending in a single plane, curved guideways 102 and/or guideways 102 extending in more than one plane are also contemplated. In some examples, at least one of the rails 108 of the guideway 102 may provide suspension, guiding, and propelling to the transport vehicles 200. For example, at least one of the rails 108 may have one or more electromagnets that magnetically interact with permanent magnets in the transport vehicles 200 to provide a vertical suspension force, a lateral guidance force, and a longitudinal propulsive force. Power is supplied to the electromagnets from a power supply 110 via one or more power cables 112. A controller 114 is configured for selectively energizing the electromagnets to control the movement of the transport vehicles 200 along the guideway 102. In some examples, the guideway 102 may be a magnetic guideway available from MagneMotion (Rockwell Automation) of Devens, Massachusetts.

Figure 3:
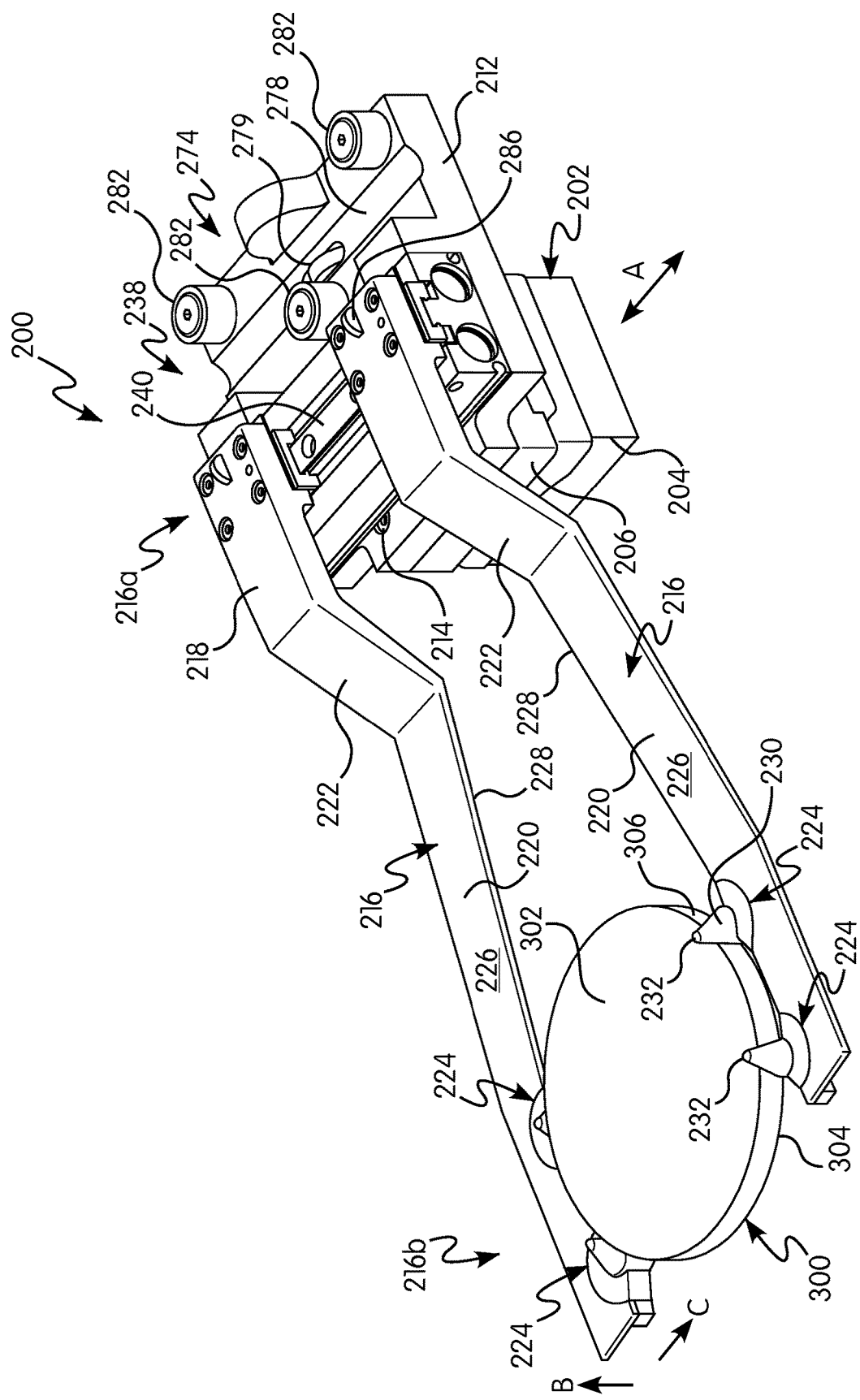
FIG. 3 is a representative perspective view of an optical article transport vehicle for use with an optical article production line according to some examples of the present invention.

With reference to FIG. 3, the exemplary transport vehicle 200 has a carrier base 202 configured for movement along the guideway 102, such as within the guide channel 106 and/or along the rails 108 (shown in FIG. 2). In the illustrated example, the carrier base 202 has a first portion 204 and a second portion 206 separated from the first portion 204 by a gap 208 (shown in FIG. 4). In some examples, at least one post 210 is provided between the first portion 204 and the second portion 206 to separate the two portions from each other, thereby defining the gap 208. The at least one post 210 may be positioned relative to the first portion 204 and the second portion 206 such that the gap 208 extends around at least a portion of an outer perimeter of the post 210. In some examples, the at least one post 210 may be positioned relative to the first portion 204 and the second portion 206 such that the gap 208 extends around the entire outer perimeter of the at least one post 210.

Figure 4:
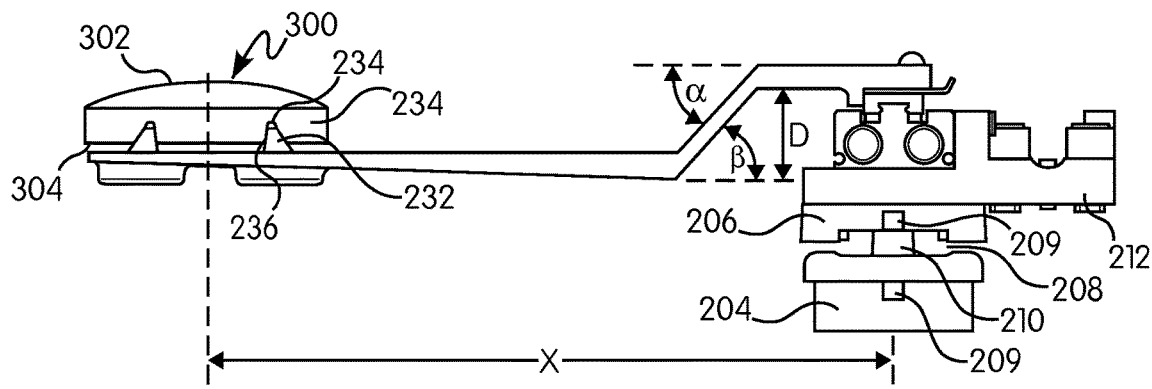
FIG. 4 is a representative side view of the optical article transport vehicle shown in FIG. 3.

With reference to FIG. 4, the gap 208 is dimensioned such that at least one of the rails 108 (shown in FIG. 2) can be fitted between an upper surface of the first portion 204 and a lower surface of the second portion 206. For example, the gap 208 may be dimensioned such that both rails 108 can be fitted on opposite sides of the at least one post 210 between the upper surface of the first portion 204 and the lower surface of the second portion 206. Desirably, the gap 208 is larger than a thickness of the rails 108 such that the first portion 204 and the second portion 206 are not in direct physical contact with the rails 108.

In some examples, at least a portion of the carrier base 202 has a magnetic flux source for magnetically interacting with the guideway 102. The magnetic flux source may be at least one permanent magnet 209 in the first portion 204, the second portion 206, and/or the post 210 to magnetically interact with the electromagnet in the guideway 102 and provide a vertical suspension force, a lateral guidance force, and a longitudinal propulsive force to the transport vehicle 200. In examples where the transport vehicle 200 is adapted for movement along the guideway 102 configured as a conveyor belt, the carrier base 202 may have an appropriate structure for mechanically interacting with the conveyor belt. For example, the carrier base 202 may have one or more wheels, bearings, or other mechanical structures for interacting with the conveyor belt.

With reference to FIG. 3, the transport vehicle 200 has a frame 212 connected to the carrier base 202. The frame 212 may be removably or non-removably connected to the carrier base 202. In some examples, the frame 212 is removably connected to the first portion 204 of the carrier base 202 by one or more fasteners 214. In other examples, the frame 212 is non-removably connected to the first portion 204 of the carrier base 202, such as by welding, adhesive, or other permanent connection means. The frame 212 may be monolithically formed with the first portion 204 and/or the second portion 206 of the carrier base 202. The frame 212 may be configured for supporting one or more mechanisms for carrying the optical article, as described herein.

Figure 5:
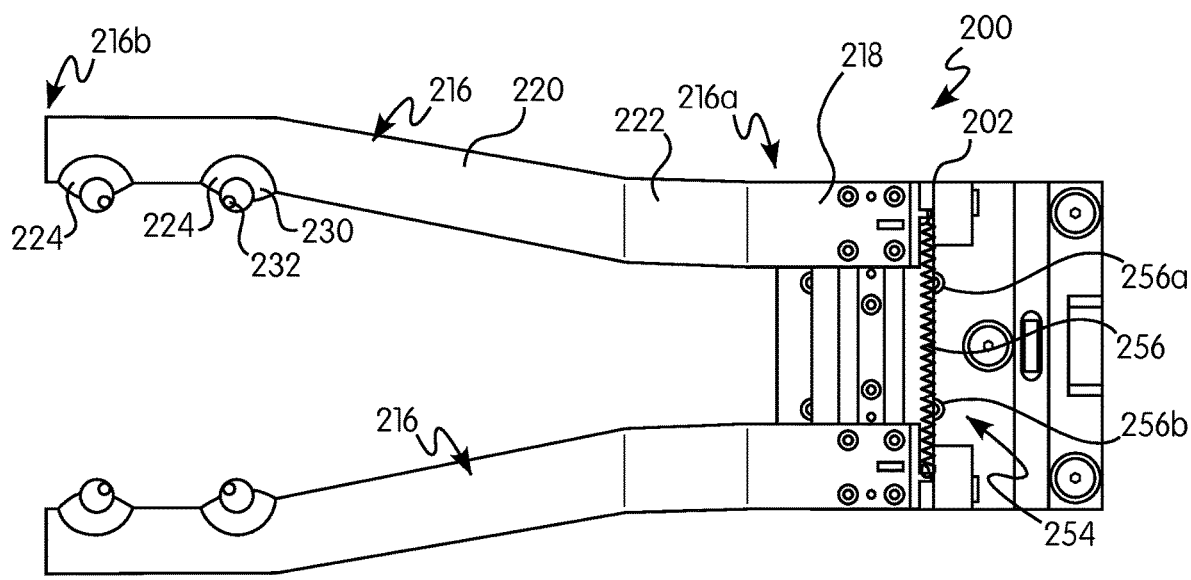
FIG. 5 is a representative top view of the optical article transport vehicle shown in FIG. 3 with a pair of gripping arms shown in an open position.

With continued reference to FIG. 3, the transport vehicle 200 has a pair of gripping arms 216 configured for holding an optical article 300 during transport. Each gripping arm 216 has a first end 216a connected to the transport vehicle 200 and a second end 216b protruding from the transport vehicle 200. In some examples, each gripping arm 216 is connected at its first end 216a to the carrier base 202, such as the first portion 204 of the carrier base 202. In other examples, each gripping arm 216 is connected at its first end 216a to the frame 212. The gripping arms 216 are movable between a closed position (FIG. 3) and an open position (FIG. 5). In the closed position, the gripping arms 216 are configured for holding the optical article 300 therebetween, while, in the open position, the optical article 300 is released from the gripping arms 216. The gripping arms 216 protrude relative to the carrier base 202 in a direction substantially perpendicular to a direction of travel of the carrier base 202 identified by arrow A in FIG. 3.

The gripping arms 216 may be shaped to prevent accumulation of liquid, such as water thereon, and to allow for easier wicking of the water from their surface during the drying process. While FIG. 3 shows the gripping arms 216 shaped in accordance with one preferred and non-limiting embodiment, other shapes are not precluded. For example, the gripping arms 216 may be comprised of flat or rounded surfaces and/or edges, or a combination of flat or rounded surfaces and/or edges.

With continued reference to FIG. 3, each of the gripping arms 216 has a first portion 218 at the first end 216a and a second portion 220 at the second end 216b. The first portion 218 is connected to the second portion 220 by a transition portion 222. In some examples, the first portion 218 may be offset relative to the second portion 220. For example, a plane defined by the first portion 218 may be offset by a predetermined distance D (shown in FIG. 4) from a plane defined by the second portion 218. In such examples, the transition portion 222 is connected to the first portion 218 such that a first angle α is defined between the first portion 218 and the transition portion 222. The first angle α may be in the range of 30° to 60°, preferably 45° to 55°, more preferably 47° to 50°. Similarly, the transition portion 222 is connected to the second portion 220 such that a second angle β is defined between the second portion 220 and the transition portion 222. The second angle β may be in the range of 30° to 60°, preferably 45° to 55°, more preferably 47° to 50°.

With continued reference to FIG. 3, the gripping arms 216 may be configured to hold the optical article 300 at a predetermined distance X away from the carrier base 202. In some examples, the predetermined distance X may be measured from a center of the carrier base 202 to a center of the optical article 300. In some examples, the predetermined distance X may be in the range of 200 mm (7.87 in.) to 300 mm (11.81 in), preferably 215 mm (8.46 in.) to 250 mm (9.84 in.), more preferably 220 mm (8.66 in.) to 230 mm (9.05 in.) from the center of the carrier base 202 to the center of the optical article 300. The predetermined distance X is selected such that the second end 216b of the gripping arms 216, and therefore the optical article 300, is maintained away from the guideway 102 to allow for processing of the optical article 300 within various processing stations 104 (shown in FIG. 1) without interference with the guideway 102. For example, the predetermined distance X may be selected such that the carrier base 202 is maintained at a safe distance away from the equipment, such as the electrode, counter-electrode, and high-voltage cabling of a corona discharge machine. Offsetting the optical article 300 from the carrier base 202 by the predetermined distance X allows the optical article 300 to be passed through various processing stations 104 without the need to remove the optical article 300 from the gripping arms 216.

With continued reference to FIG. 3, the optical article 300 has a forward or top surface 302, a rearward or bottom surface 304, and a side surface 306 extending between the top surface 302 and the bottom surface 304. When the optical article 300 is an ophthalmic lens, the bottom surface 304 is opposed to the eye of an individual wearing the optical article 300, the side surface 306 typically resides within a supportive frame, and the top surface 302 faces incident light (not shown), at least a portion of which passes through the optical article 300 and into the individual's eye. With some examples, at least one of the top surface 302, the bottom surface 304, and the side surface 306 may have various shapes including, but not limited to, round, flat, cylindrical, spherical, planar, substantially planar, plano-concave and/or plano-convex, and curved, including, but not limited to, convex, and/or concave.

The optical article 300 can be selected from ophthalmic articles or elements, display articles or elements, visors, windows, mirrors, active liquid crystal cell articles or elements, and passive liquid crystal cell articles or elements. Examples of ophthalmic articles or elements include, but are not limited to, corrective and non-corrective lenses, including single vision or multi-vision lenses, which can be either segmented or non-segmented multi-vision lenses (such as, but not limited to, bifocal lenses, trifocal lenses, and progressive lenses), as well as other elements used to correct, protect, or enhance (cosmetically or otherwise) vision, including without limitation, contact lenses, intra-ocular lenses, magnifying lenses, and protective lenses or visors. Examples of display articles, elements and devices include, but are not limited to, screens, monitors, and security elements, including without limitation, security marks and authentication marks. Examples of windows include, but are not limited to, automotive and aircraft transparencies, filters, shutters, and optical switches. The optical article 300 can comprise a polymeric organic material chosen from thermosetting polymeric organic materials, thermoplastic polymeric organic materials, or a mixture of such polymeric organic materials.

With reference to FIG. 3, each gripping arm 216 has a pair of projections 224 at the second end 216b. The projections 224 are spaced apart along a longitudinal length of the gripping arms 216 and are configured for contacting at least a portion of the optical article 300 when the gripping arms 216 are in the closed position. The projections 224 may protrude upwardly relative to an upper surface 226 of each gripping arm 216 in a direction of arrow B. In some examples, the projections 224 may also protrude inwardly from an inner lateral surface 228 of each gripping arm 216 in a direction of arrow C. The projections 224 may be removably or non-removably connected to the gripping arms 216. In some examples, each projection 224 is removably connected to the gripping arm 216 to allow replacement of the projections 224 without replacing the gripping arms 216. In other examples, each projection 224 is permanently and non-removably connected to the respective gripping arm 216 such that replacement of the projections 224 requires replacement of the gripping arms 216.

Each projection 224 has a base 230 that is connected to the gripping arm 216. In some examples, the base 230 may have a substantially cylindrical shape or any other geometric shape. Each projection 224 further has a nub 232 that protrudes upwardly from the base 230 and relative to the upper surface 226 of the gripping arm 216. In some examples, the nub 232 may have a pyramidal shape, a cylindrical shape, or any other geometric shape.

The projections 224 are configured to support the optical article 300 in one of two configurations. In a first configuration, the side surface 306 of the optical article 300 is supported on a side surface 234 of the projections 224, such as the side surface 234 of the base 230 and/or the nubs 232. Uncoated optical articles 300 are desirably supported in the first configuration because the body of the optical article 300 is held securely between the gripping arms 216 due to surface-to-surface contact between the side surface 306 of the optical article 300 and the side surface 234 of the projections 224. In a second configuration, the bottom surface 304 of the optical article 300 is supported on a top surface 236 of the projections 224, such as the top surface 236 of the nubs 232. In the second configuration, the side surface 306 and the top surface 302 of the optical article 300 do not contact the projections 224 or the gripping arms 216 to eliminate transfer of uncured coating material from the optical article 300 to the projections 224 or the gripping arms 216.

The gripping arms 216 may be made from a first material while the projections 224 may be made from a second material different from the first material. For example, the gripping arms 216 may be made from glass-filled nylon, non-glass-filled nylon, polycarbonate, or an amorphous thermoplastic polyetherimide resin commercially available under the trade name ULTEM™. Desirably, the gripping arms 216 are made from a material with low water absorption. The gripping arms 216 may be made using an injection molding process. At least a portion of each projection 224, such as the base 230 and/or the nub 232, may be made from an elastomeric material, such as a thermoplastic elastomer material. In some examples, at least a portion of each projection 224 may be made from Santoprene™, available from the ExxonMobil Corporation of Irving, Texas. The projections 224 may be co-molded with each gripping arm 216. An interface between the gripping arms 216 and the projections 224 may be water tight.

With continued reference to FIG. 3, the transport vehicle 200 has a closure mechanism 238 for moving the gripping arms 216 between the closed position and the open position. In some examples, the closure mechanism 238 is a pneumatic mechanism. In other examples, the closure mechanism 238 is a mechanical mechanism, an electrical mechanism, an electromechanical mechanism, a hydraulic mechanism, or any combination thereof. The closure mechanism 238 may be configured for biasing the pair of gripping arms 216 to the closed position and moving the gripping arms 216 to the open position when the carrier base 202 is positioned at a predetermined portion of the guideway 102, such as at a docking station of a processing station 104, as described herein.

Figure 7:
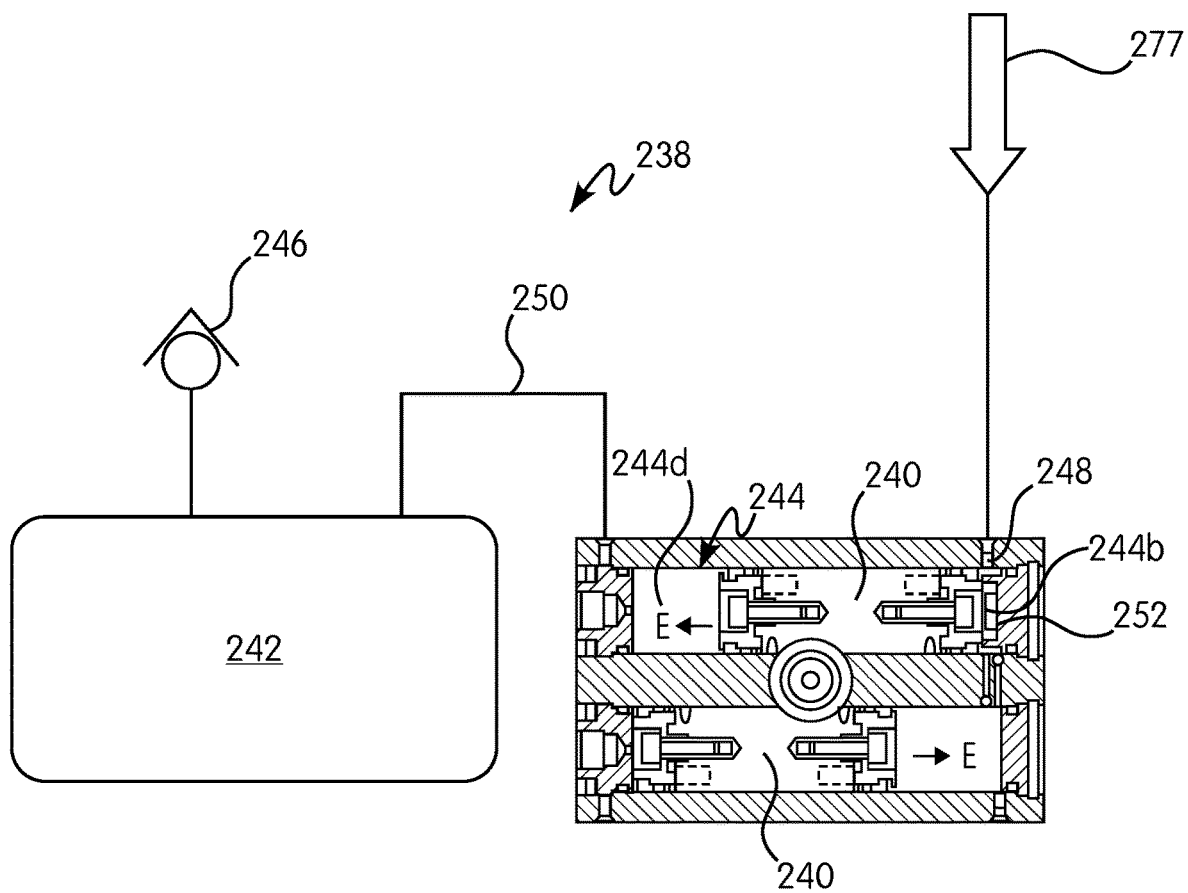
FIG. 7 is a representative schematic view of a pneumatic system of the optical article transport vehicle according to some examples of the present invention.

With reference to FIG. 7, the closure mechanism 238 is configured as a gas compression spring. The closure mechanism 238 has at least one actuator 240, a first chamber 242 on a first side of the actuator 240, and a second chamber 244 on a second side of the actuator 240. In some examples, the closure mechanism 238 has a pair of actuators 240. At least a portion of each gripping arm 216, such as the second end 216b, is connected to a separate actuator 240 (shown in FIG. 3). The first chamber 242 has a first volume and the second chamber 244 has a second volume, with the second volume being smaller than the first volume. The first chamber 242 is closed to the atmosphere with a first check valve 246 and is in fluid communication with a first side 244a of the second chamber 244 via a passage 250. The second chamber 244 is closed to the atmosphere with a second check valve 248.

Each actuator 240 is movable between an open position and a closed position within the second chamber 244 between the first side 244a and a second side 244b based on a pressure differential between the first side 244a and the second side 244b. In some examples, each actuator 240 may be in a normally closed position. In the closed position, a pressure in the first chamber 242 and the first side 244a of the second chamber 244 is higher than a pressure in the second side 244b of the second chamber 244 such that the actuator 240 is in a first or closed position. To move the actuator 240 to the open position, high pressure is applied to the second side 244b of the second chamber 244 such that the pressure in the second side 244b of the second chamber 244 is higher than the pressure in the first side 244a of the second chamber 244 and the first chamber 242. Due to this pressure differential, the actuator 240 moves within the second chamber 244 in a direction of arrow D. When the high pressure input to the second side 244b of the second chamber 244 is closed, the second side 244b is vented through a vent 252 and/or the second check valve 248 such that the pressure in the first side 244a of the second chamber 244 and the first chamber 242 moves the actuators 240 in a direction of arrows E.

Figure 8:
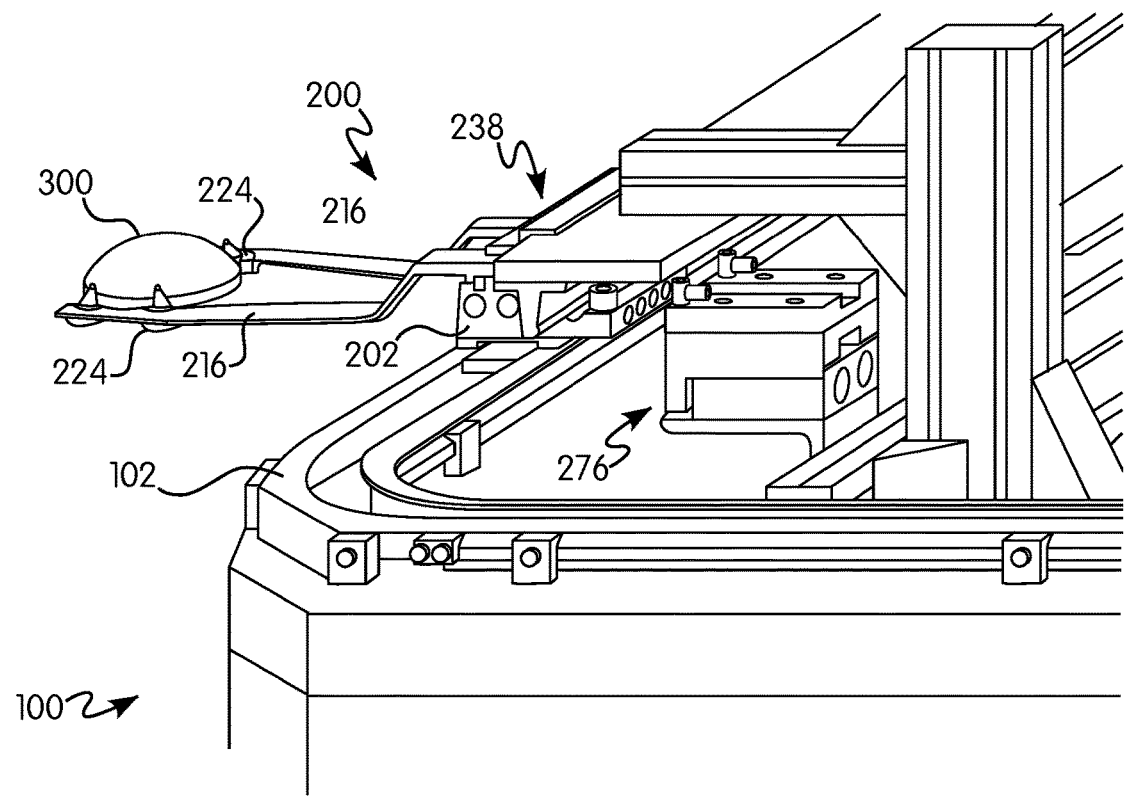
FIG. 8 is a representative perspective view of an optical article transport vehicle shown on a portion of a guideway.
Figure 9:
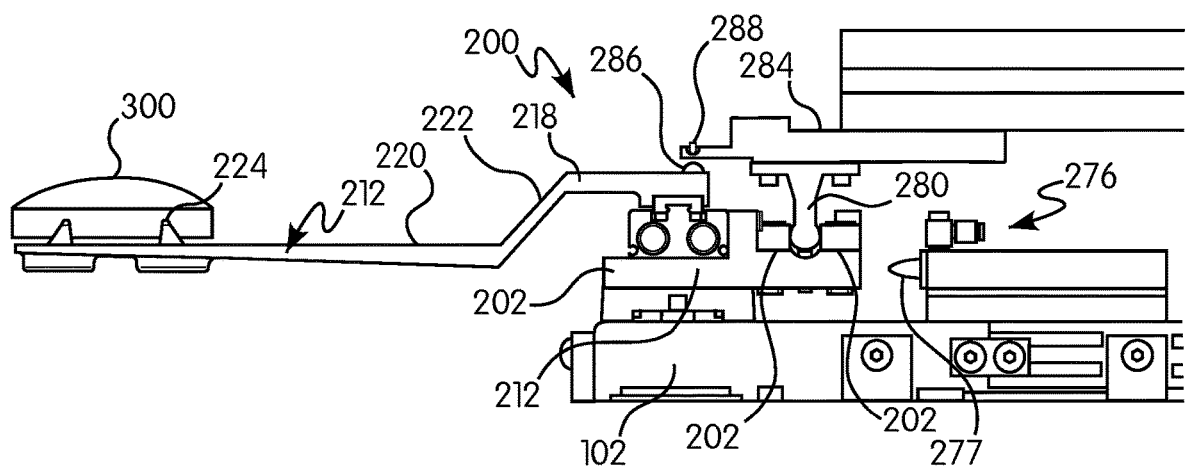
FIG. 9 is a representative side view of the optical article transport vehicle shown in FIG. 8.

With reference to FIGS. 8-9, the closure mechanism 238 is configured to move the gripping arms 216 to the open position when the carrier base 202 is positioned at a predetermined portion of the guideway 102, such as at a docking station 276. In some examples, the docking station 276 may be associated with one or more processing stations 104 (shown in FIG. 1). The gripping arms 216 may be in the normally closed position when the transport vehicle 200 is at any portion of the guideway 102 other than the docking station 276. Once the transport vehicle 200 is stopped at a docking station 276, the closure mechanism 238 may be configured to move the gripping arms 216 to the open position due to interaction with at least a portion of the docking station 276.

In some examples, the docking station 276 may have at least one pin 277 (shown in FIGS. 7 and 9) configured for interacting with the second check valve 248. In some examples, the at least one pin 277 may be movable between a first position, wherein the at least one pin 277 is not in direct physical contact with the second check valve 248 and a second position, wherein the at least one pin 277 is in direct physical contact with the second check valve 248. The docking station 276 is in fluid communication with a pressurized air source (not shown) such that pressurized air may be delivered to the second chamber 244 when the at least one pin 277 interacts with the second check valve 248. For example, the at least one pin 277 may open the second check valve 248 by pushing the second check valve 248 from a first or closed position to a second or open position. The at least one pin 277 may seal the second check valve 248 after opening the second check valve 248 to prevent the escape of pressurized air therefrom. In some examples, the at least one pin 277 may be configured for venting the second side 244b of the second chamber 244 by interacting with the vent 252 and/or the second check valve 248. For example, the pin 277 may partially open the second check valve 248 to allow venting of the second chamber 244.

Figure 6:
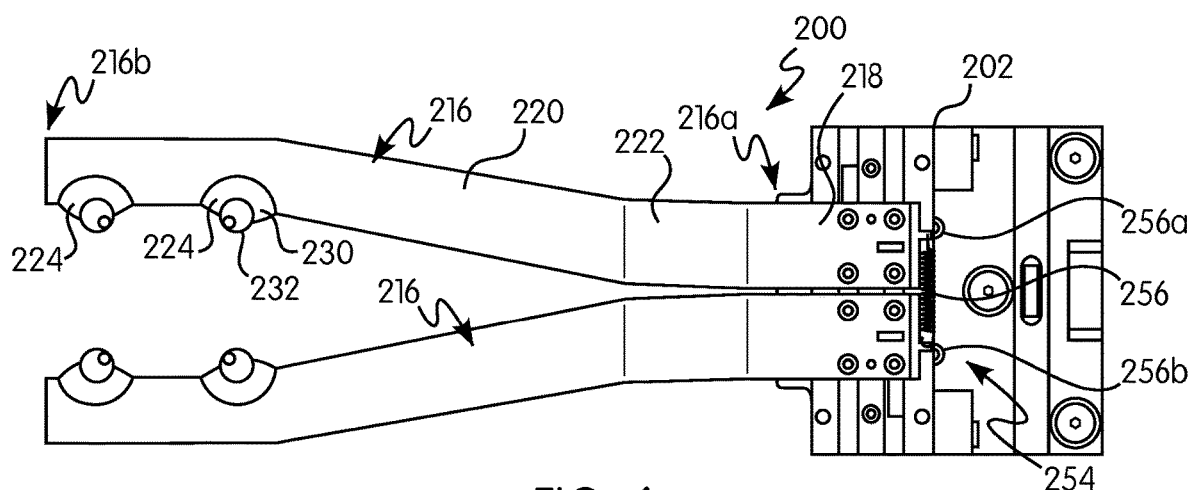
FIG. 6 is a representative top view of the optical article transport vehicle shown in FIG. 3 with the pair of gripping arms shown in a closed position.

With reference to FIGS. 5-6, the transport vehicle 200 may have a secondary closure mechanism 254 to bias the pair of gripping arms 216 to the closed position independently of the closure mechanism 238. In some examples, the secondary closure mechanism 254 is a spring 256 or a resiliently elastic band with a first end 256a connected to a first end 216a of the pair of gripping arms 216 and a second end 216b of the pair of gripping arms 216. The secondary closure mechanism 254 may provide a predetermined closing force to maintain the arms in the closed position independently of the closure mechanism 238.

Figure 10:
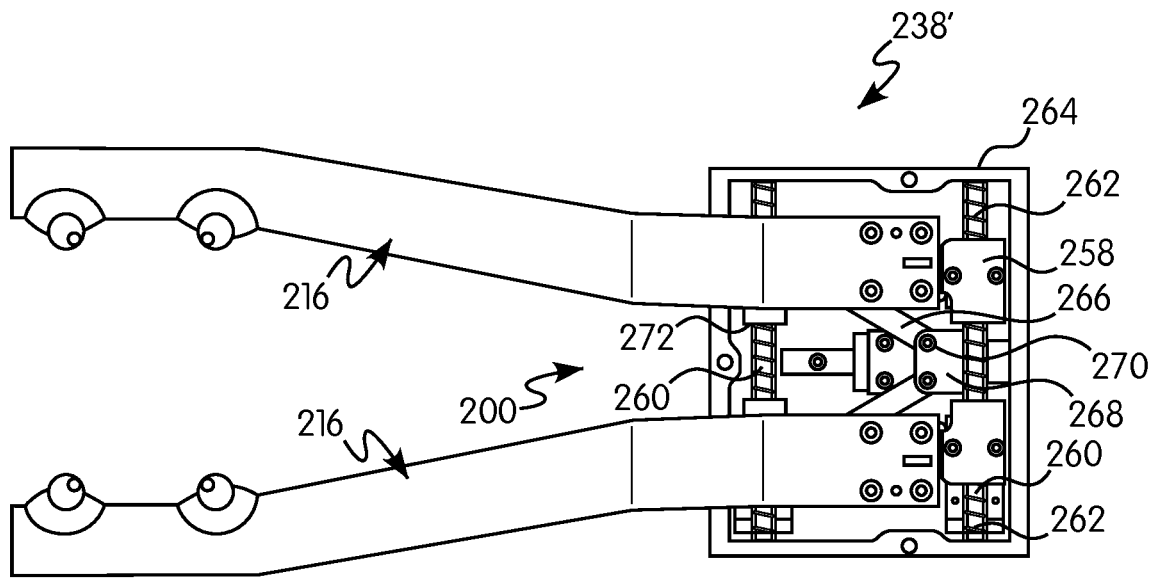
FIG. 10 is a representative top view of an optical article transport vehicle according to some examples of the present invention with a pair of gripping arms shown in an open position.
Figure 11:
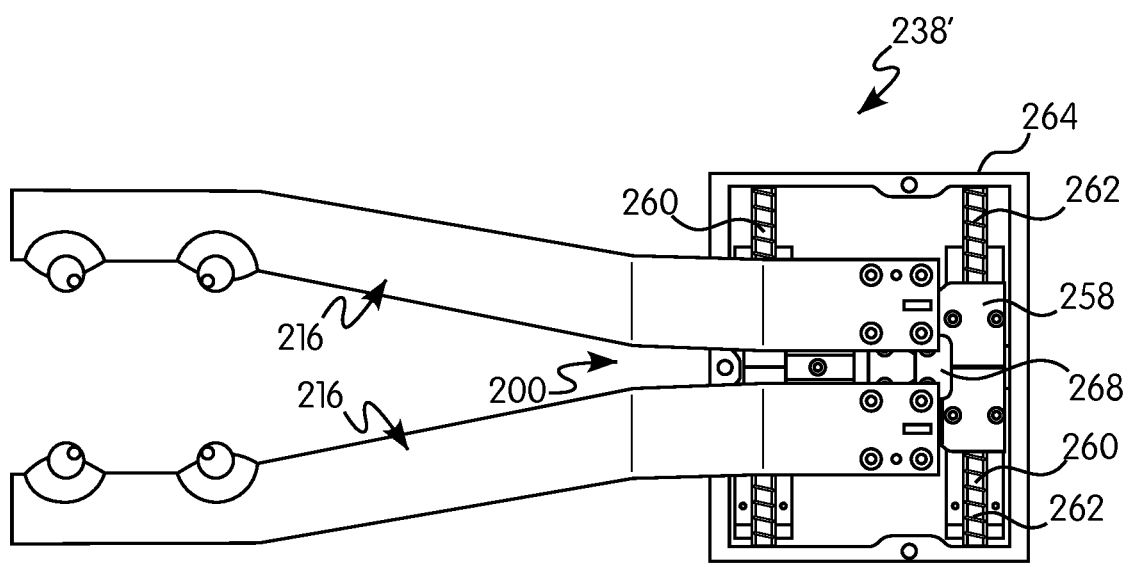
FIG. 11 is a representative top view of the optical article transport vehicle shown in FIG. 10 with the pair of gripping arms shown in a closed position.

With reference to FIGS. 10-11, the closure mechanism 238' is shown in accordance with another example. Similar to the closure mechanism 238 described herein with reference to FIG. 7, the closure mechanism 238' of FIGS. 10-11 is configured for moving the gripping arms 216 between an open position (FIG. 10) and a closed position (FIG. 11). Rather than being a pneumatic system, such as the closure mechanism 238 shown in FIG. 7, the closure mechanism 238' of FIGS. 10-11 is a mechanical system that is biased to a normally closed position by one or more springs. The closure mechanism 238' has a linkage arrangement that is movable between a first position, wherein the pair of gripping arms 216 is in the closed position (FIG. 11), and a second positon, wherein the pair of gripping arms 216 is in the open position (FIG. 10).

With continued reference to FIGS. 10-11, the linkage arrangement of the closure mechanism 238' has a pair of links 258 movable linearly along at least one rod 260. In some examples, a pair of parallel rods 260 may be spaced apart and the links 258 may be movable linearly along each of the rods 260. The gripping arms 216 are connected to the links 258 such that the gripping arms 216 are movable with movement of the links 258. Each link 258 is movable between a first or closed position (FIG. 11), and a second or open positon (FIG. 10). In the closed position, the gripping arms 216 are configured for holding the optical article 300 (not shown) therebetween, while, in the open position, the optical article 300 is released from the gripping arms 216. The links 258 are biased to the closed position by one or more springs 262 or other elastically resilient members. In some examples, the one or more springs 262 may be a pair of springs 262 on outer lateral sides of the links 258. The one or more springs 262 may be wrapped around the rod 260, such that a first end of each spring 262 contacts a housing 264, while a second end of each spring contacts one of the links 258. Each link 258 has a cam slot (not shown) configured to receive a first end of a pivot link 266. A second end of each pivot link 266 is pivotally connected to a block 268 at a pivot point 270. With linear movement of the links 258 along the rods 260, the second end of the pivot links 266 pivots about the pivot point 270, while the first end slides linearly within the cam slot. The links 258 can be moved to the open position by an opening mechanism (not shown) urging the links 258 and/or the gripping arms 216 away from each other and against the force of the springs 262. In some examples, the opening mechanism may act on an opening tab 272 formed on an inner lateral side of the links 258 and/or the gripping arms 216.

With reference to FIG. 3, the transport vehicle 200 has an alignment mechanism 274 for aligning the transport vehicle 200 relative to a docking station 276 (shown in FIGS. 8-9) on the guideway 102. The alignment mechanism 274 is configured to precisely position the transport vehicle 200 on the guideway 102 relative to the docking station 276 by constraining the transport vehicle 200 to translate along the guideway 102 with a single degree of freedom.

The alignment mechanism 274 has a slot 278 formed in the frame 212 of the transport vehicle 200 and configured for receiving at least a portion of an alignment rail 280 of the docking station 276. As shown in FIG. 3, the slot 278 extends in a direction that is substantially parallel to a direction of travel of the transport vehicle 200. In some examples, one or more guide wheels 279 may be provided within the slot 278 for guiding the frame 212 along the alignment rail 280. With reference to FIGS. 8-9, the alignment rail 280 is also positioned substantially parallel to the guideway 102. In this manner, when the transport vehicle 200 is aligned with the alignment rail 280, the movement of the transport vehicle 200 is constrained to translation along the guideway 102 guided by the alignment rail 280. In some examples, the alignment rail 280 is secured to a frame 284 to constrain the alignment rail 280 relative to the guideway 102. In some examples, the alignment rail 280 extends along the entire guideway 102. In some examples, the alignment rail 280 extends along predetermined portions of the guideway 102, such as at the docking station 276 of at least one processing station 104.

With reference to FIG. 3, the alignment mechanism 274 further has at least one centering element 282 configured for engaging the alignment rail 280. In some examples, the at least one centering element 282 may be a pair of rotatable cam followers that straddle the alignment rail 280 on opposite lateral sides of the alignment rail 280, such as shown in FIG. 9. In other examples, three or more rotating cam followers may be provided. FIG. 3 shows three centering elements 282 arranged in a staggered orientation with one centering element 282 is configured to engage a first lateral side of the alignment rail 280, and a pair of centering elements is configured to engage a second lateral side of the alignment rail 280 (see FIG. 9).

With continued reference to FIG. 3, the transport vehicle 200 has at least one arm position indicator 286 configured for indicating a position of at least one of the gripping arms 216. In some examples, the at least one arm position indicator 286 may be associated with at least one of the gripping arms 216. In some examples, the at least one arm position indicator 286 is connected to one of the gripping arms 216. In other examples, each of the gripping arms 216 has at least one arm position indicator 286. The at least one arm position indicator 286 may be connected to at least a portion of the gripping arms 216, such as the first portion 218, the second portion 220, and/or the transition portion 222. In some examples, the at least one arm position indicator 286 protrudes upwardly from an upper surface 226 of the first portion 218 of at least one gripping arm 216.

With reference to FIG. 9, the at least one arm position indicator 286 is a permanent magnet that is configured for magnetically interacting with at least one position sensor 288 on the frame 284 and/or the alignment rail 280. In some examples, the at least one position sensor 288 may be a Hall effect sensor that varies its output signal based on a sensed magnetic field of the at least one arm position indicator 286. For example, the signal strength of the at least one positon sensor 288 may be within a first range when the gripping arms 216 are in a first or open position, and the signal strength may increase or decrease to a second range when the gripping arms 216 are in a second or closed position. In some examples, a pair of position sensors 288 may be provided, wherein a first of the pair of position sensors 288 is configured to detect the open position of the gripping arms 216, while a second of the pair of sensors 288 is configured to detect the closed position of the gripping arms 216.

Having described the structure of the transport vehicle 200, an exemplary method of transporting the optical article 300 along the guideway 102 between various processing stations 104 will now be described. Initially, an empty transport vehicle 200 is loaded with an optical article 300 at a loading/unloading station 104f. The empty transport vehicle 200 may stop at a docking station 276 of the loading/unloading station 104f, wherein the gripping arms 216 are moved from a closed position to an open position to allow for loading of the optical article 300 therebetween. For example, the closure mechanism 238 may move the gripping arms 216 to the open position when the carrier base 202 of the transport vehicle 200 is positioned at the docking station 276 of the loading/unloading station 104f. The docking station 276 is in fluid communication with a pressurized air source (not shown) such that pressurized air may be delivered to the second chamber 244 when the at least one pin 277 interacts with the second check valve 248. High pressure is applied to the second side 244b of the second chamber 244 such that the pressure in the second side 244b of the second chamber 244 is higher than the pressure in the first side 244a of the second chamber 244 and the first chamber 242. Due to this pressure differential, the actuators 240 move within the second chamber 244 to open the gripping arms 216.

After positioning the optical article 300 such that the side surface 306 of the optical article 300 is aligned with a side surface 234 of the projections 224, such as the side surface 234 of the base 230 and/or the nubs 232, the gripping arms 216 may be moved to the closed position, by venting the second chamber 244, and allowing the actuators 240 to move to the closed position due to a pressure differential between the first chamber 242 and the second chamber 244.

With the optical article 300 securely held between the gripping arms 216, the transport vehicle 200 may be guided along the guideway 102 between one or more processing stations 104. For example, the transport vehicle 200 may transport the optical article 300 through the pre-treatment station 104a. As described herein, the pre-treatment station 104a may be a pass-through processing station wherein the optical article 300 moves through the plasma surface treatment machine, while the carrier base 202 is outside of the machine. The positioning of the gripping arms 216 allows the optical article 300 to move through the pre-treatment station 104a without having to remove the optical article 300 from the transport vehicle 200.

After treating the surface of the optical article 300 in the pre-treatment station 104a, the transport vehicle 200 may guide the optical article 300 through the washing/drying station 104b. Similar to the pre-treatment station 104a, the washing/drying station 104b may be a pass-through processing station wherein the optical article 300 moves through the washing/drying machine, while the carrier base 202 is outside of the machine. The washing/drying station 104b may have high pressure spray nozzles which spray a cleaning agent, such as deionized water, to clean the surface of the optical article 300, after which the optical article 300 is dried, such as with forced air nozzles. The gripping arms 216 may be shaped to prevent accumulation of water thereon, and to allow for easier wicking of the water from their surface during the drying process.

After washing and drying the optical article 300, the transport vehicle 200 may guide the optical article 300 to a coating station 104c. In some examples, the coating station 104c has a docking station 276 wherein optical article 300 is unloaded from the transport vehicle 200 and loaded into the coating station 104c for coating. After at least one surface of the optical article 300 has been coated, the coated optical article 300 is loaded onto the same transport vehicle 200 that delivered the optical article 300 to the coating station 104c, or onto another empty transport vehicle 200. The coated optical article 300 may be loaded on the gripping arms 216 such that the bottom surface 304 of the optical article 300 is supported on a top surface 236 of the projections 224, such as the top surface 236 of the nubs 232. In this manner, the side surface 306 and the top surface 302 of the optical article 300 do not contact the projections 224 or the gripping arms 216 to eliminate transfer of uncured coating material from the optical article 300 to the projections 224 or the gripping arms 216.

The transport vehicle 200 may guide the coated optical article 300 to a curing station 104d. Similar to the pre-treatment station 104a and the washing/drying station 104b, the curing station 104d may be a pass-through processing station wherein the optical article 300 moves through the curing machine, while the carrier base 202 is outside of the machine. In some examples, the cured optical article 300 may undergo several additional processing steps, such as additional washing/drying, coating, and/or curing steps. After the final processing step, the finished optical article 300 may be inspected at the inspection station 104e before the optical article 300 is unloaded from the production line 100 at the loading/unloading station 104f.

In further examples, the optical article transport vehicle can be characterized by one or more of the following clauses:

Clause 1: An article transport vehicle comprising: a carrier base configured for movement along a guideway; a pair of gripping arms, each gripping arm having a first end connected to the carrier base and a second end protruding from the carrier base, the pair of gripping arms movable between a closed position configured for holding an article and an open position configured for releasing the article; and a closure mechanism for moving the pair of gripping arms between the closed position and the open position, the closure mechanism biasing the pair of gripping arms to the closed position and moving the pair of gripping arms to the open position when the carrier base is positioned at a predetermined portion of the guideway.

Clause 2: The article transport vehicle of clause 1, wherein the closure mechanism comprises an actuator, a first chamber on a first side of the actuator, and a second chamber on a second side of the actuator.

Clause 3: The article transport vehicle of clause 2, wherein the first chamber has a first volume and the second chamber has a second volume, wherein the second volume is smaller than the first volume.

Clause 4: The article transport vehicle of clause 2 or 3, wherein, in the closed position, a pressure in the first chamber is higher than a pressure in the second chamber such that the actuator is in a first position, and wherein, in the open positon, the pressure in the first chamber is lower than the pressure in the second chamber such that the actuator is in a second position.

Clause 5: The article transport vehicle of any of clauses 1-4, wherein the closure mechanism comprises a linkage arrangement movable between a first position, wherein the pair of gripping arms is in the closed position, and a second positon, wherein the pair of gripping arms is in the open position.

Clause 6: The article transport vehicle of clause 5, wherein the linkage arrangement is biased to the first position by at least one biasing spring.

Clause 7: The article transport vehicle of any of clauses 1-6, wherein the second end of each gripping arm has a pair of projections protruding inwardly from an inward lateral surface and upwardly from an upper surface of each gripping arm.

Clause 8: The article transport vehicle of clause 7, wherein at least one of the pair of gripping arms is made from a first material and at least one of the projections is made from a second material different from the first material.

Clause 9: The article transport vehicle of any of clauses 1-8, further comprising a secondary closure mechanism to bias the pair of gripping arms to the closed position.

Clause 10: The article transport vehicle of clause 9, wherein the secondary closure mechanism is a spring or a resiliently elastic band.

Clause 11: The article transport vehicle of any of clauses 1-10, further comprising at least one arm position indicator on at least one of the pair of gripping arms, the at least one arm position indicator configured for indicating a position of the at least one of the pair of gripping arms.

Clause 12: The article transport vehicle of clause 11, wherein the at least one arm position indicator is a permanent magnet.

Clause 13: The article transport vehicle of any of clauses 1-12, further comprising at least one centering element configured for engaging an alignment rail along at least a portion of the guideway for centering the carrier base relative to the guideway.

Clause 14: The article transport vehicle of any of clauses 1-13, wherein the pair of gripping arms protrude relative to the carrier base in a direction substantially perpendicular to a direction of travel of the carrier base.

Clause 15: The article transport vehicle of any of clauses 1-14, wherein the carrier base comprises a magnetic flux source.

Clause 16: A production line comprising: a guideway; one or more processing stations positioned along the guideway; and one or more article transport vehicles configured for movement along at least a portion of the guideway, each of the one or more article transport vehicles comprising a carrier base; a pair of gripping arms, each gripping arm having a first end connected to the carrier base and a second end protruding from the carrier base, the pair of gripping arms movable between a closed position configured for holding an article and an open position configured for releasing the article; and a closure mechanism for moving the pair of gripping arms between the closed position and the open position, the closure mechanism biasing the pair of gripping arms to the closed position and moving the pair of gripping arms to the open position when the carrier base is positioned at a predetermined portion of the guideway.

Clause 17: The production line of clause 16, wherein the closure mechanism comprises an actuator, a first chamber on a first side of the actuator, and a second chamber on a second side of the actuator.

Clause 18: The production line of clause 17, wherein the first chamber has a first volume and the second chamber has a second volume, wherein the second volume is smaller than the first volume.

Clause 19: The production line of clause 17 or 18, wherein, in the closed position, a pressure in the first chamber is higher than a pressure in the second chamber such that the actuator is in a first position, and wherein, in the open positon, the pressure in the first chamber is lower than the pressure in the second chamber such that the actuator is in a second position.

Clause 20: The production line of any of clauses 16-19, wherein the closure mechanism comprises a linkage arrangement movable between a first position, wherein the pair of gripping arms is in the closed position, and a second positon, wherein the pair of gripping arms is in the open position.

Clause 21: The production line of clause 20, wherein the linkage arrangement is biased to the first position by at least one biasing spring.

Clause 22: The production line of any of clauses 16-21, wherein the second end of each gripping arm has a pair of projections protruding inwardly from an inward lateral surface and upwardly from an upper surface of each gripping arm.

Clause 23: The production line of clause 22, wherein at least one of the pair of gripping arms is made from a first material and at least one of the projections is made from a second material different from the first material.

Clause 24: The production line of any of clauses 16-23, further comprising a secondary closure mechanism to bias the pair of gripping arms to the closed position.

Clause 25: The production line of clause 24, wherein the secondary closure mechanism is a spring or a resiliently elastic band.

Clause 26: The production line of any of clauses 16-25, further comprising at least one arm position indicator on at least one of the pair of gripping arms, the at least one arm position indicator configured for indicating a position of the at least one of the pair of gripping arms.

Clause 27: The production line of clause 26, wherein the at least one arm position indicator is a permanent magnet.

Clause 28: The production line of any of clauses 16-27, further comprising at least one centering element configured for engaging an alignment rail along at least a portion of the guideway for centering the carrier base relative to the guideway.

Clause 29: The production line of any of clauses 16-28, wherein the pair of gripping arms protrude relative to the carrier base in a direction substantially perpendicular to a direction of travel of the carrier base.

Clause 30: The production line of any of clauses 16-29, wherein the carrier base comprises a magnetic flux source.

Clause 31: The production line of any of clauses 16-30, wherein the guideway has an open loop configuration or a closed loop configuration.

Clause 32: The production line of any of clauses 16-31, wherein the guideway is a moving belt, a track, or a combination thereof.

Clause 33: The production line of any of clauses 16-32, wherein the guideway has a guide channel positioned between a pair of rails.

Clause 34: The production line of any of clauses 16-33, wherein the guideway has one or more electromagnets that magnetically interact with the one or more article transport vehicles.

Clause 35: The production line of any of clauses 16-34, wherein the one or more processing Clause 36: The production line of any of clauses 16-35, stations is a pre-treatment station having a plasma chamber.

Clause 37: The production line of any of clauses 16-36, wherein the one or more processing stations is a drying station.

Clause 38: The production line of any of clauses 16-37, wherein the one or more processing stations is a washing station.

Clause 39: The production line of any of clauses 16-38, wherein the one or more processing stations is a coating station.

Clause 40: The production line of any of clauses 16-39, wherein the one or more processing stations is a curing station.

Clause 41: The production line of any of clauses 16-40, wherein the one or more processing stations is an inspection station.

Clause 42: The production line of any of clauses 16-41, wherein the one or more processing stations is a loading/unloading station.

Clause 43: A method of transporting articles along a guideway, the method comprising: providing one or more article transport vehicles configured for movement along at least a portion of the guideway, each of the one or more article transport vehicles comprising a carrier base; a pair of gripping arms, each gripping arm having a first end connected to the carrier base and a second end protruding from the carrier base, the pair of gripping arms movable between a closed position configured for holding an article and an open position configured for releasing the article; and operating a closure mechanism when the carrier base is positioned at a predetermined portion of the guideway to move the pair of gripping arms from the closed position to the open position.

Clause 44: The method of clause 43, wherein the closure mechanism comprises an actuator, a first chamber on a first side of the actuator, and a second chamber on a second side of the actuator.

Clause 45: The method of clause 44, wherein the first chamber has a first volume and the second chamber has a second volume, wherein the second volume is smaller than the first volume.

Clause 46: The method of clause 44 or 45, wherein, in the closed position, a pressure in the first chamber is higher than a pressure in the second chamber such that the actuator is in a first position, and wherein, in the open positon, the pressure in the first chamber is lower than the pressure in the second chamber such that the actuator is in a second position.

Clause 47: The method of any of clauses 43-46, wherein the closure mechanism comprises a linkage arrangement movable between a first position, wherein the pair of gripping arms is in the closed position, and a second positon, wherein the pair of gripping arms is in the open position.

Clause 48: The method of clause 47, wherein the linkage arrangement is biased to the first position by at least one biasing spring.

Clause 49: The method of any of clauses 43-48, wherein the second end of each gripping arm has a pair of projections protruding inwardly from an inward lateral surface and upwardly from an upper surface of each gripping arm.

Clause 50: The method of clause 49, wherein at least one of the pair of gripping arms is made from a first material and at least one of the projections is made from a second material different from the first material.

Clause 51: The method of any of clauses 43-50, further comprising a secondary closure mechanism to bias the pair of gripping arms to the closed position.

Clause 52: The method of clause 51, wherein the secondary closure mechanism is a spring or a resiliently elastic band.

Clause 53: The method of any of clauses 43-52, further comprising at least one arm position indicator on at least one of the pair of gripping arms, the at least one arm position indicator configured for indicating a position of the at least one of the pair of gripping arms.

Clause 54: The method of clause 53, wherein the at least one arm position indicator is a permanent magnet.

Clause 55: The method of any of clauses 43-54, further comprising at least one centering element configured for engaging an alignment rail along at least a portion of the guideway for centering the carrier base relative to the guideway.

Clause 56: The method of any of clauses 43-55, wherein the pair of gripping arms protrude relative to the carrier base in a direction substantially perpendicular to a direction of travel of the carrier base.

Clause 57: The method of any of clauses 43-56, wherein the carrier base comprises a magnetic flux source.

The present invention has been described with reference to specific details of particular examples thereof. It is not intended that such details be regarded as limitations upon the scope of the invention except insofar as and to the extent that they are included in the accompanying claims.

What is claimed is:

1. An article transport vehicle comprising:
a carrier base configured for movement along a guideway;
a pair of gripping arms, each gripping arm having a first end connected to the carrier base and a second end protruding from the carrier base, the pair of gripping arms movable between a closed position configured for holding an article and an open position configured for releasing the article; and
a closure mechanism for moving the pair of gripping arms between the closed position and the open position, the closure mechanism biasing the pair of gripping arms to the closed position and moving the pair of gripping arms to the open position when the carrier base is positioned at a predetermined portion of the guideway,
wherein the second end of each gripping arm has a pair of projections protruding inwardly from an inward lateral surface and upwardly from an upper surface of each gripping arm.

2. The article transport vehicle of claim 1, wherein the closure mechanism comprises an actuator, a first chamber on a first side of the actuator, and a second chamber on a second side of the actuator.

3. The article transport vehicle of claim 2, wherein the first chamber has a first volume and the second chamber has a second volume, wherein the second volume is smaller than the first volume.

4. The article transport vehicle of claim 2, wherein, in the closed position, a pressure in the first chamber is higher than a pressure in the second chamber such that the actuator is in a first position, and wherein, in the open position, the pressure in the first chamber is lower than the pressure in the second chamber such that the actuator is in a second position.

5. The article transport vehicle of claim 1, wherein the closure mechanism comprises a linkage arrangement movable between a first position, wherein the pair of gripping arms is in the closed position, and a second position, wherein the pair of gripping arms is in the open position.

6. The article transport vehicle of claim 5, wherein the linkage arrangement is biased to the first position by at least one biasing spring.

7. The article transport vehicle of claim 1, wherein at least one of the pair of gripping arms is made from a first material and at least one of the projections is made from a second material different from the first material.

8. The article transport vehicle of claim 1, further comprising a secondary closure mechanism to bias the pair of gripping arms to the closed position.

9. The article transport vehicle of claim 8, wherein the secondary closure mechanism is a spring or a resiliently elastic band.

10. The article transport vehicle of claim 1, further comprising at least one arm position indicator on at least one of the pair of gripping arms, the at least one arm position indicator configured for indicating a position of the at least one of the pair of gripping arms.

11. The article transport vehicle of claim 10, wherein the at least one arm position indicator is a permanent magnet.

12. The article transport vehicle of claim 1, further comprising at least one centering element configured for engaging an alignment rail along at least a portion of the guideway for centering the carrier base relative to the guideway.

13. The article transport vehicle of claim 1, wherein the pair of gripping arms protrude relative to the carrier base in a direction substantially perpendicular to a direction of travel of the carrier base.

14. The article transport vehicle of claim 1, wherein the carrier base comprises a magnetic flux source.

15. A method of transporting articles along a guideway, the method comprising: providing one or more article transport vehicles configured for movement along at least a portion of the guideway, each of the one or more article transport vehicles comprising a carrier base; a pair of gripping arms, each gripping arm having a first end connected to the carrier base and a second end protruding from the carrier base, the pair of gripping arms movable between a closed position configured for holding an article and an open position configured for releasing the article; and operating a closure mechanism when the carrier base is positioned at a predetermined portion of the guideway to move the pair of gripping arms from the closed position to the open position,
wherein the second end of each gripping arm has a pair of projections protruding inwardly from an inward lateral surface and upwardly from an upper surface of each gripping arm.

16. The method of claim 15, wherein the closure mechanism comprises an actuator, a first chamber on a first side of the actuator, and a second chamber on a second side of the actuator.

17. The method of claim 16, wherein the first chamber has a first volume and the second chamber has a second volume, wherein the second volume is smaller than the first volume.

18. The method of claim 16, wherein, in the closed position, a pressure in the first chamber is higher than a pressure in the second chamber such that the actuator is in a first position, and wherein, in the open position, the pressure in the first chamber is lower than the pressure in the second chamber such that the actuator is in a second position.

19. The method of claim 15, wherein the closure mechanism comprises a linkage arrangement movable between a first position, wherein the pair of gripping arms is in the closed position, and a second position, wherein the pair of gripping arms is in the open position.

* * * * *